United States Patent [19]

Okamoto et al.

[11] Patent Number: 4,660,200
[45] Date of Patent: Apr. 21, 1987

[54] METHOD AND APPARATUS FOR PROCESSING AN ERROR FLAG OF A PCM SIGNAL

[75] Inventors: Hiroo Okamoto; Masaharu Kobayashi, both of Yokohama, Japan

[73] Assignee: Hitachi, Ltd., Tokyo, Japan

[21] Appl. No.: 784,593

[22] Filed: Oct. 4, 1985

[30] Foreign Application Priority Data

Oct. 5, 1984 [JP] Japan ................................ 59-208192

[51] Int. Cl.$^4$ ............................................. G06F 11/10
[52] U.S. Cl. ......................................... 371/37; 371/39
[58] Field of Search ........................ 371/37, 38, 39, 40

[56] References Cited

U.S. PATENT DOCUMENTS

| 4,437,185 | 3/1984 | Sako ................................ 371/37 X |
| 4,577,319 | 3/1986 | Takeuchi .............................. 371/38 |
| 4,593,394 | 6/1986 | Tomimitsu ........................ 371/38 X |
| 4,593,395 | 6/1986 | Immink ............................... 371/40 |

Primary Examiner—Jerry Smith
Assistant Examiner—Robert W. Beausoliel, Jr.
Attorney, Agent, or Firm—Antonelli, Terry & Wands

[57] ABSTRACT

Method and apparatus for reproducing a PCM signal are disclosed. The PCM signal comprises a plurality of word-interleaved frames. Each frame comprises a plurality of data blocks and a parity block. Each data block comprises a plurality of words, each word comprises an upper symbol and a lower symbol arranged symbol by symbol. A plurality of upper symbols included in different blocks and a plurality of lower symbols included in the same word form a parity code generated from the symbols in the respective symbol sequences and a plurality of error detection/correction blocks. In the error flag processing of the PCM signal, the input PCM signal is reproduced, errors are detected and corrected based on the corresponding parity codes for a plurality of upper symbol error detection/correction sequences and a plurality of lower symbol error detection/correction sequences, error flags indicating the number of errors detected and the number of errors corrected are generated for the error detection/correction sequences based on the result of the error detection/correction, a flag indicating a maximum significant value is detected from two flags generated for the upper and lower symbol error detection/correction sequence of the same word and selecting that flag as a common flag to both sequences.

5 Claims, 10 Drawing Figures

FIG. 1

FIG. 2
BLOCK FORMAT

FIG. 3
WORD CONFIGURATION

FIG. 6
ERROR FLAG PROCESSOR 21

FIG. 7
F'c2 GENERATOR 26

ERROR JUDGING CIRCUIT 36

METHOD AND APPARATUS FOR PROCESSING AN ERROR FLAG OF A PCM SIGNAL

BACKGROUND OF THE INVENTION

The present invention relates to a technique to reproduce a PCM signal, and more particularly to method and apparatus for processing an error flag suitable for reproducing a digital audio PCM signal such as rotary head type PCM signal reproduction.

In a PCM signal reproduction apparatus such as a digital audio system, an error of a PCM signal generated in a transmission system including a signal source is detected and corrected. If an incorrectable error is detected in the PCM signal, an audio signal is reproduced by error concealment such as means value interpolation.

As disclosed in U.S. Pat. No. 4,577,319 issued on Mar. 18, 1986 by Takeuchi et al, entitled "Error Flag Processor", which is a continuation of U.S. patent application Ser. No. 422,299 filed on Sept. 23, 1982 and now abandoned, and which was filed based on Japanese Patent Application Nos. 56-153702, 56-153704 and 56-153706 and assigned to the present assignee, an error flag to be added to an incorrectable data is generated by an error correction circuit and written into an error detection/correction code area of a data memory. In this method, the data memory can be effectively utilized but the circuit for generating the error flag is of large scale and the number of times of access to the data memory for writing the error flag increases.

SUMMARY OF THE INVENTION

It is an object of the present invention to provide method and apparatus for reproducing a PCM signal, which are easy to generate an error flag and reduce the number of times of access to a data memory.

It is another object of the present invention to provide method and apparatus for processing an error flag, which can reduce a capacity of a memory for processing PCM signal reproduction.

In accordance with the teaching of the present invention, in error detection and correction in the reproduction of the PCM signal supplied from a signal source, an error flag is added for each unit of an error detection/correction code, one error flag which shows a maximum significant value is selected from upper symbol error flags and lower symbol error flags for word signals comprising upper symbols and lower symbols, and the selected error flag is written into the data memory. As a result, the number of components of the error flag processor is reduced and the circuit is simplified, the number of times of access to the data memory is reduced, and the capacity of the memory is reduced.

In the present invention, the error flag for each word is saved based on the fact that a data (interleave) matrix which uses the error detection/correction code for the row includes upper symbols and lower symbols which form words, respectively in the same respective rows.

DESCRIPTION OF THE PREFERRED EMBODIMENTS

Figure 1:
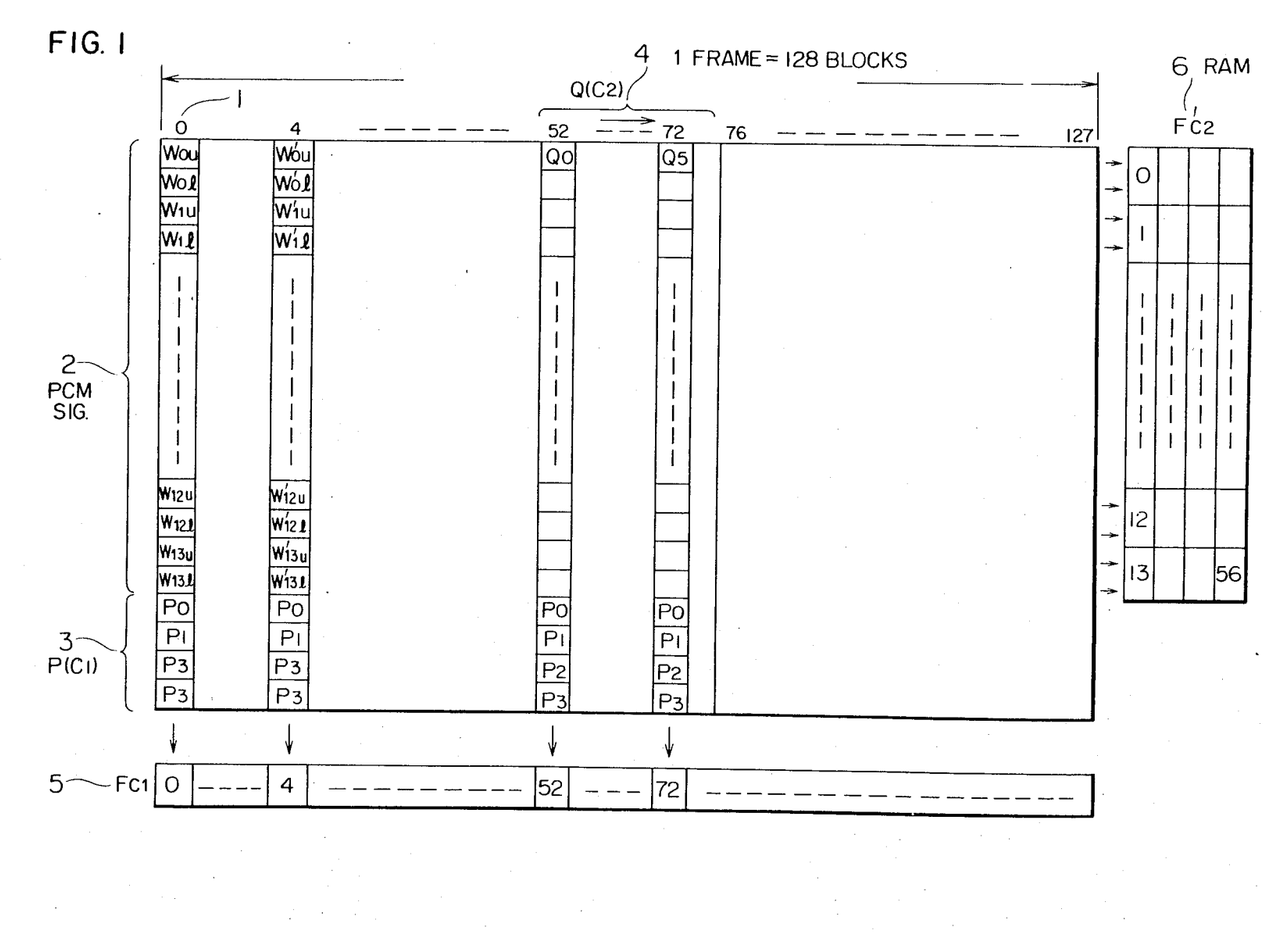
FIG. 1 shows formats of data and error flag in one embodiment of the present invention.

Referring to FIG. 1, one embodiment of the present invention is explained.

FIG. 1 shows formats of data and flag. Numeral 1 denotes one block of data. 128 blocks form one frame. Numeral 2 denotes a PCM signal, numeral 3 denotes a first error detection/correction signal, and numeral 4 denotes a second error detection/correction signal. In the present embodiment, the PCM signal is double-encoded to enhance an error detection capability and an error correction capability. Numeral 5 denotes an error flag $F_{C1}$ added to each block sequence, and numeral 6 denotes an error flag $F_{C2}'$ added to each Q sequence.

Figure 2:
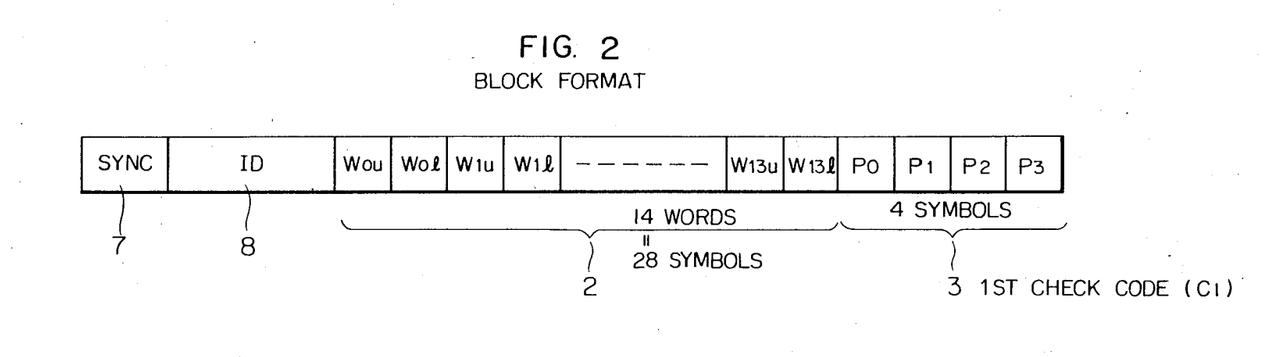
FIG. 2 shows a block format.
Figure 3:
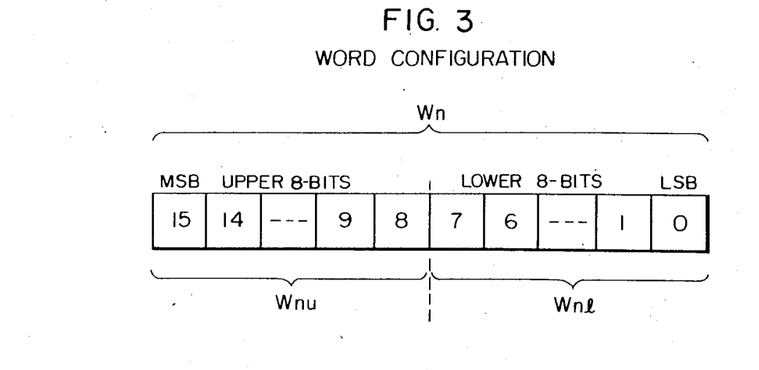
FIG. 3 shows a PCM signal format.

FIG. 2 shows a detail of the format of the block 1 shown in FIG. 1. Numeral 7 denotes a synchronization signal and numeral 8 denotes an ID signal which includes a block address or information on the PCM signal. The synchronization signal 7 and the ID signal 8 are omitted in FIG. 1. One block of PCM signal 2 comprises 14 words (1 word: 16 bits). Each PCM signal word is divided into upper 8 bits and lower 8 bits as shown in FIG. 3. (The 8-bit data is called a symbol.) By processing the data by 8-bit unit, the circuit scale of the signal processor can be reduced. Such a PCM signal format is used in a digital audio apparatus which uses a compact disc or digital audio tape. The first error detection/correction codes 3 each having four symbols $P_0-P_3$ are added to the PCM signal 2 having 28 symbols to form error detection/correction code sequences called $C_1$. The first error detection and correction code may be a Reed-Solomon code having a code length of 32 symbols, the number of information words of 28 symbols and a minimum distance of 5. As seen from FIG. 1, portions of the PCM signal 2 in the 52nd to 75th blocks are second error detection/correction codes.

The second error detection/correction codes $(Q_0-Q_5)$ 4 are added to the lateral PCM signal of FIG. 1. For example, $Q_0$, $Q_1$, --- $Q_5$ at the tops of the 52nd, 56th, --- 72nd blocks are added to 32 4-block interleaved symbols $W_{ou}$ of the 0th, 4th, 8th, --- 48th, 76th, --- 124th blocks. There are 56 second error detection and correction code sequences (called $C_2$ series or sequences) in one frame.

The second error detection/correction code may be a Reed-solomon code having a code length of 32 symbols, the number of information words of 26 symbols and a minimum distance of 7. The PCM signal to be reproduced is encoded by this code.

In order to detect and correct errors in reproducing the coded PCM signal, the first error detection/correction is done for the first error detection/correction code $(P_0-P_8)$, and then the second error detection/correction is done for the second error detection/correction code $(Q_0-Q_5)$.

When the Reed-Solomon code having the minimum distance 5 is used as the first error detection/correction code $(P_0-P_3)$, an error up of the two symbols can be corrected. Accordingly, in the first error detection/correction, the error of up to two symbols is corrected for the first error detection/correction code, and the first error flag $F_{C1}$ of two bits for representing four contents is added to each code sequence.

| | |
|---|---|
| No error | $F_{CI} = 0$ |
| 1 symbol correction | $F_{CI} = 1$ |
| 2 symbols correction | $F_{CI} = 2$ |
| Error of more than 2 symbols | $F_{CI} = 3$ |

In the second error detection/correction, an erasure is corrected by using the first error flag $F_{C1}$ as an error at a known position. When the Reed-Solomon code having the minimum distance 7 is used as the second error detection/correction code, the errors can be corrected within a range of $2e+S<7$, where e is the number of erasure bits and S is the number of error bits at unknown positions, as is known as a characteristic of this error detection/correction code. One example of the second error detection/correction is explained below.

(1) The number of errors is detected, and if the number of errors is no more than two symbols, the errors are corrected.

(2) If the number of errors is three or larger, the correction method is selected depending on the value of $F_{C1}$ as shown in the table. $N_1$ ($F_{C1}$) and $N_2$ ($F_{C1}$) and numbers of symbols which meet $F_{C1} \geq 2$ and $F_{C1} = 3$, respectively. If the error is incorrectable, the second error flag $F_{C2}$ having the value shown in the table is added. When the error is correctable, $F_{C2}=0$.

| $N_1$ ($F_{CI}$) | $N_2$ ($F_{CI}$) | Correction | $F_{C2}$ |
|---|---|---|---|
| 0 | — | — | 2 |
| 1 | — | correct 1 erasure + 2 errors | 2 |
| 2 | — | correct 2 erasures + 2 errors | 2 |
| 3 | — | correct 3 erasures + 1 error | 2 |
| 4 | — | correct 4 erasures + 1 error | 2 |
| 5 | — | correct 5 erasures | 2 |
| 6 or more | 0 | — | 1 |
| 6 or more | 1 | correct 1 erasure + 2 errors | 1 |
| 6 or more | 2 | correct 2 erasures + 2 errors | 1 |
| 6 or more | 3 | correct 3 erasures + 1 error | 1 |
| 6 or more | 4 | correct 4 erasures | 1 |
| 6 or more | 5 | correct 5 erasures | 1 |
| 6 | 6 | correct 6 erasures | — |
| 7 or more | 6 | — | 1 |
| — | 7 or more | — | 1 |

In the above error correction method, two types of error flags $F_{C1}$ and $F_{C2}$ are added to each symbol. Presence or absence of error is determined as shown in the following table. The data determined to include error is corrected by previous value holding or means value interpolation.

| $F_{C2}$ | $F_{CI}$ | Error |
|---|---|---|
| 0 | 0 | No |
| 0 | 1 | No |
| 0 | 2 | No |
| 0 | 3 | No |
| 1 | 0 | No |
| 1 | 1 | No |
| 1 | 2 | Yes |
| 1 | 3 | Yes |
| 2 | 0 | No |
| 2 | 1 | Yes |
| 2 | 2 | Yes |
| 2 | 3 | Yes |

In this manner, the error flags are added in the first and second error detection/correction, and the errors are corrected and concealed by utilizing the error flags so that the error detection capability and the error correction capability are improved. In the above error correction method, the error detection capability is $7 \times 10^{16}$ $P_S^{17}$ and the error correction capability is $3 \times 10^{23}$ $P_S^{17}$, where $P_S$ is a symbol error rate. If $P_S = 10^{-2}$, a probability of misdetection is $7 \times 10^{-18}$ and a probability of incorrection is $3 \times 10^{-11}$.

The algorithm for the above error correction is disclosed in U.S. patent application Ser. No. 665,378 by the present inventors, entitled "Decoding method and System for Doubly-Encoded Reed-Solomon Codes" filed on Oct. 26, 1984, based on Japanese Patent Application No. 58-202602 filed in Japan on Oct. 31, 1983, and assigned to the present assignee, whose disclosure is incorporated herein by reference.

In FIG. 1, numerals 5 and 6 denote error flags for P and Q sequences, respectively. As described above, the error flags $F_{C1}$ and $F_{C2}$ are added for each of the P and Q sequences of the error detection/correction codes. There are 128 sequences of the first error detection/correction code ($P_1$-$P_3$) in each frame. Accordingly, the first error flag $F_{C1}$ is added to each sequence. On the other hand, there are 112 sequences of the second error detection/correction code ($Q_0$-$Q_5$). Accordingly, there are 112 second error flags $F_{C2}$. However, only 56 second error flags $F_{C2}$ need be stored. As shown in FIG. 3, one word of PCM signal is divided into the upper symbol and the lower symbol. The error concealment is performed for each word. Accordingly, the error flag used for the error concealment need be added for each word. In the first error detection/correction code sequence, the upper symbol and the lower symbol are contained in the same sequence. In the second error detection/correction code sequence, the upper symbol and the lower symbol are contained in different sequences. For example, the symbols $W_{1u}$ and $W_{1l}$ of the same word are contained in the 0-th line in the P sequence, but they are contained in the third and fourth lines in the Q sequence. Thus, for the second error flag, $F_{C2}'$ is generated after the error detection and correction based on $F_{C2}$ added to the upper symbol and $F_{C2}$ added to the lower symbol, and $F_{C2}'$ is stored. The $F_{C2}$ represents a worst value of $F_{C2}$ added to the upper symbol and the lower symbol of the same word. The error concealment is carried out based on $F_{C1}$ and $F_{C2}'$ in accordance with the above table. Thus, the error flags can be generated by a simple error flag processor, the memory capacity required for the error flags is reduced and the number of times of access to the memory is reduced. A maximum one of the flags for the upper symbol and the lower symbol is selected as a representative flag $F_{C2}'$. Thus, $F_{C2}'$ is generated as shown below for $F_{C2}$ shown in the above table. In the error concealment, $F_{C2}$ in the above table is replaced by $F_{C2}'$.

| Symbol Error Flag $F_{C2}$ | | Representative Error Flag $F_{C2}'$ |
|---|---|---|
| Upper Symbol | Lower Symbol | |
| 0 | 0 | 0 |
| 0 | 1 | 1 |
| 0 | 2 | 2 |
| 1 | 0 | 1 |
| 1 | 1 | 1 |
| 1 | 2 | 2 |
| 2 | 0 | 2 |
| 2 | 1 | 2 |
| 2 | 2 | 2 |

Figure 4:
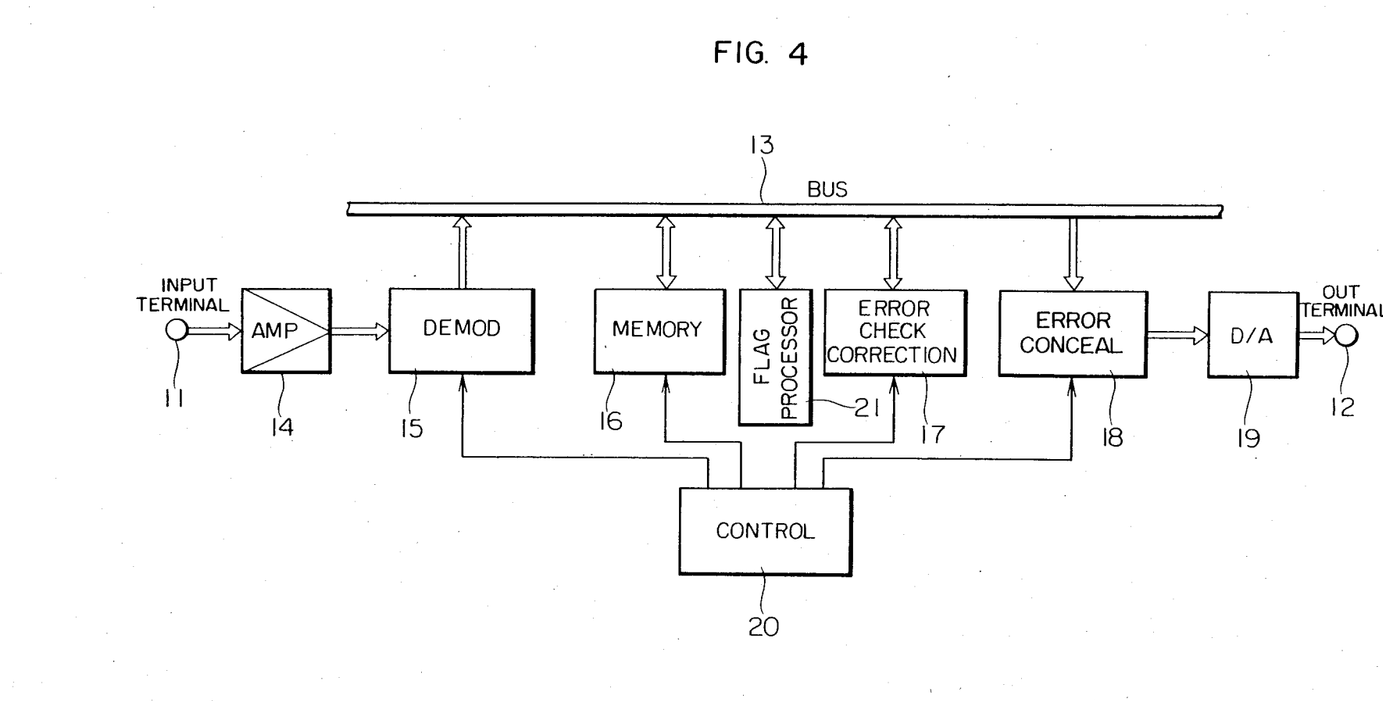
FIG. 4 shows a configuration of a PCM signal reproduction apparatus.

FIG. 4 shows an embodiment of a PCM signal reproduction apparatus which reproduces a PCM signal in accordance with the present invention. Numeral 11 denotes an input terminal to which an input signal to be reproduced is applied and which is connected to a signal source or an input signal transmission line, numeral 12 denotes an output terminal of the reproduction apparatus, numeral 13 denotes a bus, numeral 14 denotes an amplifier, numeral 15 denotes a demodulator, numeral 16 denotes a memory, numeral 17 denotes an error detection/correction circuit, numeral 18 denotes a concealment circuit, numeral 19 denotes a D/A converter, numeral 20 denotes a control circuit, and numeral 21 denotes an error flag processor. Referring to a timing chart of FIG. 5, the operation of the present apparatus is explained.

Figure 5:
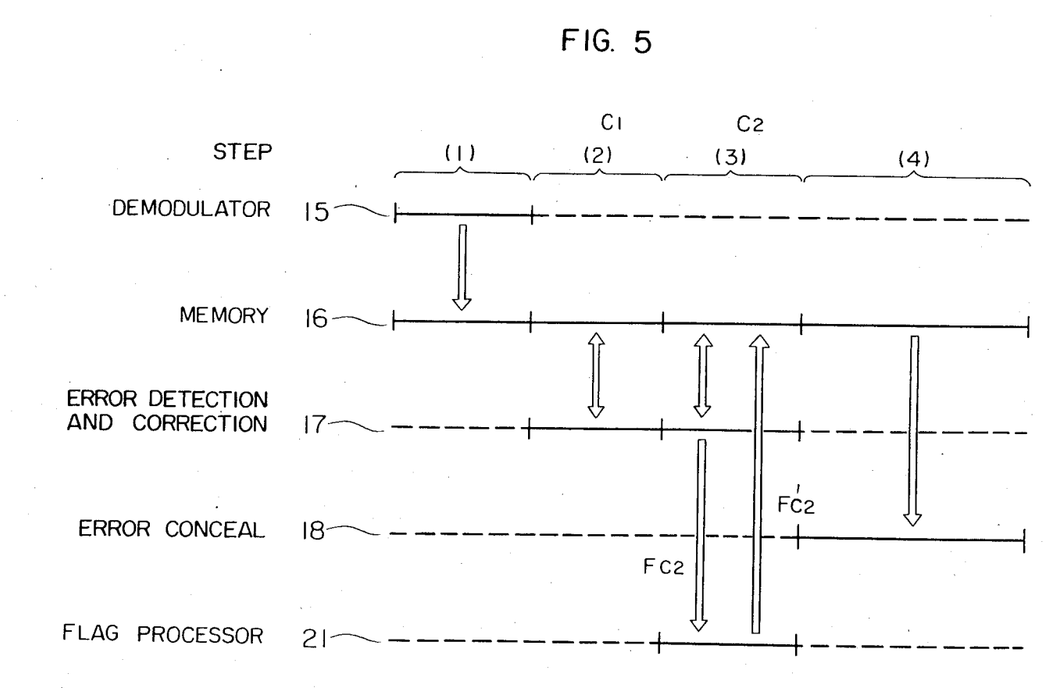
FIG. 5 shows a timing chart.

In a time slot (step) (1), the reproduced data is stored in the memory (RAM) 16. More specifically, the PCM signal to be reproduced applied to the input terminal 11 is amplified to a predetermined level by the amplifier 14. The data is demodulated by the demodulator 15 and the synchronization signal is detected. The data thus reproduced is stored in the memory 16 through the bus line 13.

In the step (2), the first error detection/correction is carried out. The data is supplied from the memory 16 to the error detection/correction circuit 17 to carry out the first error detection/correction, and the data stored in the memory 16 is corrected if it is correctable. The first error flag $F_{C1}$ is stored in the memory 16. The first error flag may be stored in an independent area but the area in which the first error detection/correction codes $P_0$-$P_3$ have been stored is utilized to save the memory space. Since the error detection/correction code is not necessary after the error detection/correction, the error flag may be stored in that area.

In the step (3), the second error detection/correction is carried out. The data is supplied from the memory 16 to the error detection/correction circuit 17 to carry out the second error detection/correction, and the data stored in the memory 16 is corrected if the data is correctable. The second error flag $F_{C2}$ for each symbol generated in the error detection/correction is supplied to the error flag processor 21 to generate the error flag $F_{C2}$ for the word.

Figure 6:
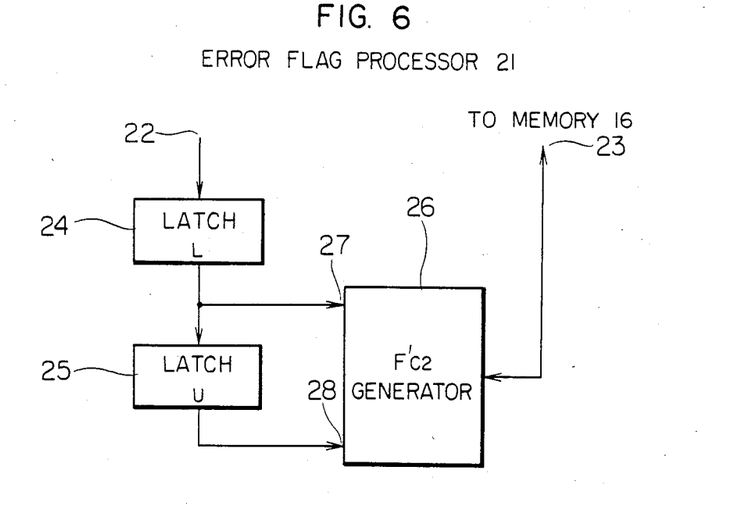
FIG. 6 shows an error flag processor.
Figure 7:
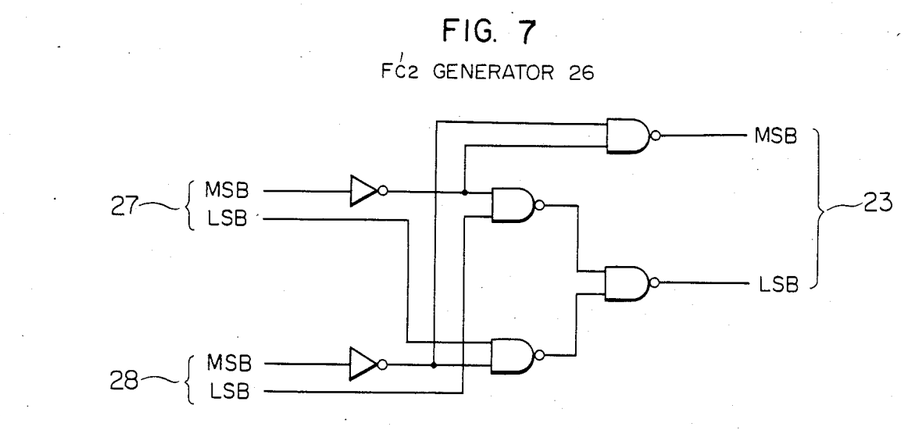
FIG. 7 shows an error flag $F_{C2}'$ generator.

The error flag processor 21 is shown in FIG. 6. Numerals 24 and 25 denote latch circuits for latching the upper symbol flag and the lower symbol flag, respectively, and numeral 26 denotes an $F_{C2}$ generator. The second error flag $F_{C2}$ generated in the error detection/correction circuit 17 is supplied to the latch circuit 24 through the input terminal 22 of the error flag processor 21. The $F_{C2}$ stored in the latch circuit 24 is also supplied to the latch circuit 25. In this manner, the upper symbol flag $F_{C2}$ and the lower symbol flag $F_{C2}$ are stored in the latch circuits 24 and 25. The $F_{C2}'$ generator 26 generates $F_{C2}'$ based on those $F_{C2}$ and stores it in the RAM 16 through the output terminal 23. The $F_{C2}'$ generator 26 may comprise gate circuits as shown in FIG. 7.

The error flag $F_{C2}'$ generated by the error flag processor 21 is stored in the memory 16. The area in which the error flag $F_{C2}'$ is stored may be the area in which the second error detection codes $Q_u$-$Q_5$ have been stored, like the first error flag.

Figure 8:
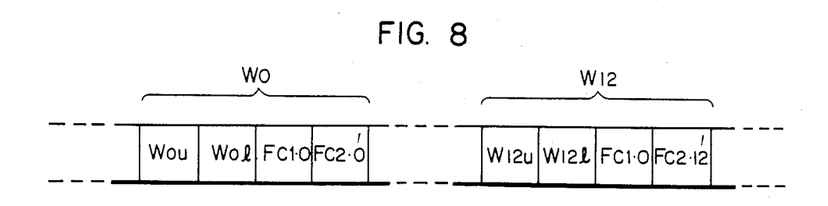
FIG. 8 shows a timing for outputting a PCM signal.

In the step (4), the error-corrected PCM signal is outputted. The error-corrected data stored in the memory 16 is supplied to the error concealment circuit 18. When one word of PCM signal is to be outputted, the upper and lower symbol error flags $F_{C1}$ and $F_{C2}'$ are sequentially supplied to the error concealment circuit 18 as shown in FIG. 8.

Figure 9:
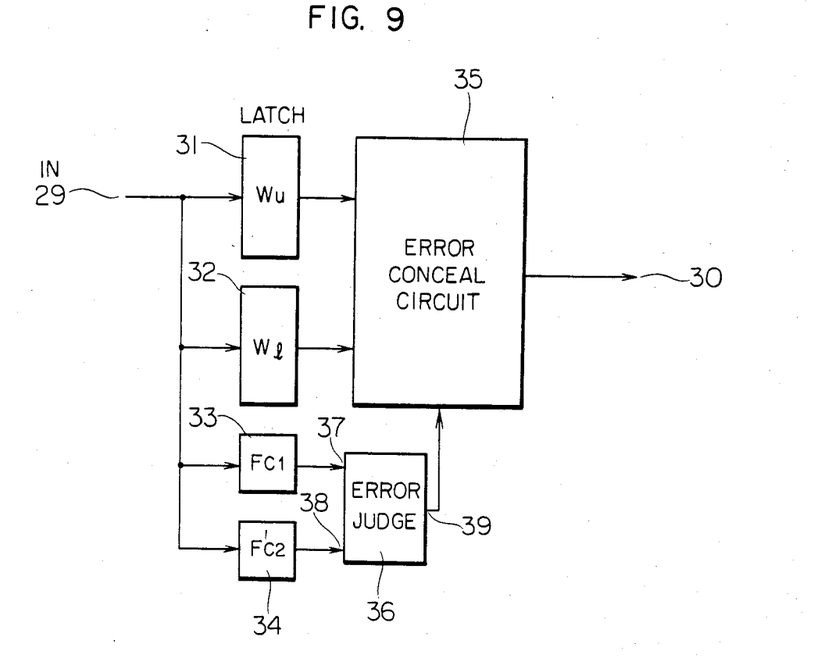
FIG. 9 shows an error correction circuit.
Figure 10:
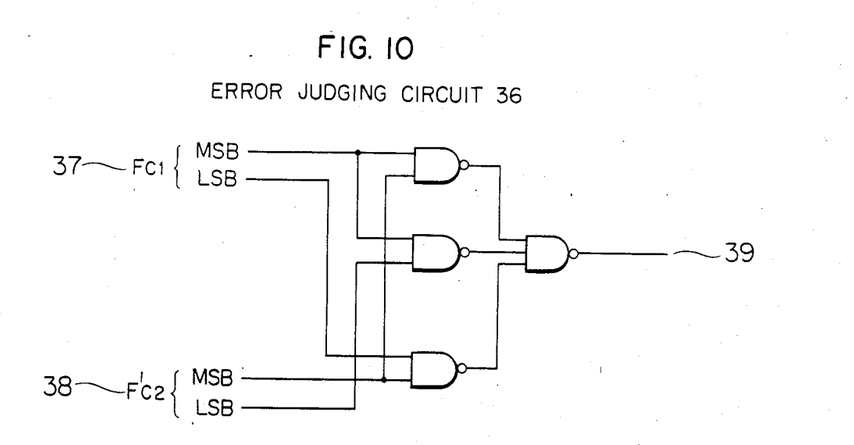
FIG. 10 shows an error detection circuit.

The error concealment circuit 18 is shown in FIG. 9. Numerals 31-34 denote latch circuits, numeral 35 denotes an interpolation circuit and numeral 36 denotes an error discrimination circuit. The upper symbol $W_u$, lower symbol $W_l$ and error flags $F_{C1}$ and $F_{C2}'$ supplied from the input terminal 29 are stored in the latch circuits 31-34. The upper symbol $W_u$ and lower symbol $W_l$ are supplied to the interpolation circuit as one word of PCM signal. The error flags $F_{C1}$ and $F_{C2}'$ are supplied to the error discrimination circuit 36, which determines whether the PCM signal is in error or not. The error discrimination circuit 36 may comprise gate circuits as shown in FIG. 10. If the PCM signal is determined to include error, the interpolation circuit 35 conceals the error by means value interpolation.

The error-concealed PCM signal from the error concealment circuit 18 is converted to an analog signal by the D/A converter 19 and the analog signal is supplied to the output terminal 12.

In accordance with the present embodiment, the error flag is processed by the simple error flag processor, and the memory capacity of the memory is reduced and the number of times of access to the memory is reduced.

As an alternative of the data format shown in FIG. 1, a block which consists of only data blocks and a block which consists of data blocks and parity blocks ($P_0$-$P_3$) may be used. This format is disclosed in U.S. patent application Ser. No. 712,094 by the present inventors filed on Mar. 15, 1985, entitled "Rotary Head Type PCM Recording and Reproducing Method and System", based on Japanese Patent Application No. 59-50915 filed on Mar. 19, 1984 and assigned to the present assignee, which disclosure is incorporated herein by reference, and particularly in FIG. 14 thereof.

In the above embodiment, the error detection/correction data format which uses the doubly-encoded Reed-Solomon codes is shown although the present invention is not limited thereto but the present invention is equally applicable to an error detection/correction code data format of only Q sequence for the PCM signal in which one word comprises two symbols.

We claim:

1. A method for processing a PCM signal comprising a plurality of frames having interleaved words, each frame including a plurality of data blocks and parity blocks, each data block including a plurality of words, each word comprising an upper symbol and a lower symbol arranged symbol by symbol, a plurality of upper symbols included in different blocks and a plurality of lower symbols included in the same word forming parity codes generated by the symbols in the respective symbol sequences and a plurality of error detection/correction blocks;

said method comprising the steps of:
(a) reproducing the input PCM signal and detecting and correcting errors based on corresponding parity codes for the upper symbol error detection/correction sequences and lower symbol error detection/correction sequences;
(b) generating an error flag indicating whether an incorrectable error or errors are present for each error detection/correction sequence based on the result of the error detection/correction; and (c) detecting a flag indicating a maximum significant value based on two flags generated for the error detection/correction sequences for the upper symbol and the lower symbol in one word and selecting the detected flag as a common flag to both sequences.

2. A method for processing a PCM signal according to claim 1 further comprising the steps of determining if an incorrectable error is included in the word based on the common flag added to the error detection/correction sequence and concealing the word based on the result of the determination.

3. A method for reproducing a PCM signal having words each comprising an upper symbol and a lower symbol, each block comprising a plurality of upper symbols and a plurality of lower symbols, a second error detection/correction code being added to each of a plurality of upper symbols included in different blocks and a plurality of lower symbols included in the same PCM signals as those in which said plurality of upper symbols are included, a first error detection/correction code being added to each of a plurality of upper symbols and lower symbols of a plurality of PCM signals included in different second error detection/correction code sequences (plural-block interleaved symbols) or a plurality of second error detection/correction codes;

said method comprising the steps of:
(a) detecting and correcting errors for the first error detection/correction code as first error detection/-correction step;
(b) adding a first error flag indicating whether an incorrectable error or errors are present for each of the first error detection/correction sequences;
(c) detecting and correcting errors for the second error detection/correction code as second error detection/correction step, generating a second flag indicating an incorrectable error if the error is incorrectable, and adding a flag indicating a maximum significant value of the code sequences to the second error detection/correction code including the upper symbol and the lower symbol of the PCM signal; and
(d) determining if the PCM signal includes an incorrectable error or not based on said first error flag and said second error flag.

4. A PCM signal reproduction apparatus for reproducing a PCM signal having words each comprising an upper symbol and a lower symbol, each block comprising a plurality of upper symbols and a plurality of lower symbols, a second error detection/correction code being added to each of a plurality of upper symbols included in different blocks and a plurality of lower symbols included in the same PCM signals as those in which said plurality of upper symbols are included, a first error detection/correction code being added to each of a plurality of upper symbols and lower symbols of a plurality of PCM signals included in different second error detection/correction code sequences (plural-block interleaved symbols) or a plurality of second error detection/correction codes;

comprising:
a demodulator for reproducing a digital signal from a reproduced signal;
a readable/writable memory for storing the digital signal reproduced by said demodulator, a corrected PCM signal and error flags;
an error correction circuit for effecting first and second error detections/corrections by error detection/correction code sequences for the reproduced digital signal stored in said memory and generating first and second error flags;
an error flag processor for selecting, as a second error flag, a maximum significant value of the error flags added to the second error detection/correction code sequence comprising only the upper symbols and the second error detection/correction code sequence comprising only the lower symbols, and
an error concealment circuit for determining if the PCM signal includes an incorrectable error or not based on said first and second error flags and concealing the error if the incorrectable error is included.

5. A PCM signal reproduction apparatus according to claim 4 wherein said first and second error flags are stored in an area of said memory at which said first and/or second error detection/correction codes have been stored.

* * * * *